United States Patent
Ogawa

(10) Patent No.: US 6,385,951 B1
(45) Date of Patent: May 14, 2002

(54) ROTARY PLANT MOWING APPARATUS EMPLOYING AUTO-ROTATION OF BLADE UNITS

(75) Inventor: Junji Ogawa, Shizuoka-ken (JP)

(73) Assignee: Marujun Juko Kabushikiasha, Inasa-gun (JP)

( * ) Notice: Subject to any disclaimer, the term of this patent is extended or adjusted under 35 U.S.C. 154(b) by 0 days.

(21) Appl. No.: 09/543,574

(22) Filed: Apr. 5, 2000

(30) Foreign Application Priority Data

Apr. 5, 1999 (JP) .......................................... 11-098035
Jun. 3, 1999 (JP) .......................................... 11-156713

(51) Int. Cl.[7] ............................................. A01D 34/03
(52) U.S. Cl. ............................................. 56/16.7; 56/6
(58) Field of Search ............................... 56/6, 295, 255, 56/249, 16.7, 15.8, DIG. 3; 192/55.1, 55.61, 71.17; 172/15; 30/276; 464/67

(56) References Cited

U.S. PATENT DOCUMENTS

| | | | | |
|---|---|---|---|---|
| 2,038,284 A | * | 4/1936 | Hanson | 56/11.8 |
| 3,397,521 A | * | 8/1968 | Danuser | 56/11.9 |
| 3,526,083 A | * | 9/1970 | Barry et al. | 56/10.7 |
| 3,570,637 A | * | 3/1971 | Pitman | 192/224.1 |
| 3,715,872 A | * | 2/1973 | Thompson, Jr. | 56/10.4 |
| 3,931,859 A | * | 1/1976 | Van Der Lely | 172/247 |
| 4,112,656 A | * | 9/1978 | Ranko et al. | 56/320.1 |
| 4,148,173 A | * | 4/1979 | Hoff | 56/11.3 |
| 4,201,033 A | * | 5/1980 | Meek et al. | 56/13.6 |
| 4,215,526 A | * | 8/1980 | Van Der Lely | 56/12.7 |
| 4,333,303 A | * | 6/1982 | Plamper | 56/11.3 |
| 4,343,138 A | * | 8/1982 | Neuerburg | 56/15.9 |
| 4,416,107 A | * | 11/1983 | Hoff | 56/11.3 |
| 4,597,251 A | * | 7/1986 | Cornellier | 56/17.6 |
| 4,696,381 A | * | 9/1987 | Johnson, Sr. | 192/17 R |
| 4,815,259 A | * | 3/1989 | Scott | 56/6 |
| 4,888,939 A | * | 12/1989 | Crane | 56/13.6 |
| 5,065,639 A | * | 11/1991 | Flanhardt et al. | 74/417 |
| 5,450,714 A | * | 9/1995 | Lurwig | 56/13.5 |
| 5,471,824 A | * | 12/1995 | Neely | 56/10.4 |
| 5,809,765 A | * | 9/1998 | Hastings et al. | 56/295 |
| 5,826,414 A | * | 10/1998 | Lenczuk | 56/14.7 |
| 6,003,292 A | * | 12/1999 | Waibel | 56/320.2 |
| 6,250,056 B1 | * | 6/2001 | Spagnolo | 56/235 |

* cited by examiner

Primary Examiner—Thomas B. Will
Assistant Examiner—Arpád Fábián Kovács
(74) Attorney, Agent, or Firm—Armstrong, Westerman & Hattori, LLP

(57) ABSTRACT

A plant mowing apparatus in which a driven case is rotationally engaged by way of a braking device to a cylindrical frame having a rotary driving shaft pivoted therein and a plurality of cutter rotary shafts each having rotary blade units joined at the top end is attached to the driven case in parallel with the rotary driving shaft, rotary bodies having predetermined circumferential ratio are fixed respectively, to the rotary driving shaft and the cutter rotary driving shaft, and the rotary body for the cutter rotary shaft and the rotary body for the rotary driving shaft are connected by way of a rotation transmitting unit, such that the cutter rotary shaft revolves under auto-rotation. The cutter unit of the rotary blade having a plurality of blade edges at the circumferential side and each of the blade edges is turned to the rotational direction for cutting by the change of the attaching angle, the rotary blade unit and the cutter rotary shaft are engaged under pressure by way of a resilient member. Vertical slits are formed to the cover in a case where a side cover is used while skids may be attached in a case of not using the side cover.

9 Claims, 11 Drawing Sheets

ROTARY PLANT MOWING APPARATUS EMPLOYING AUTO-ROTATION OF BLADE UNITS

BACKGROUND OF THE INVENTION

1. Field of the Invention

The present invention concerns a rotary plant mowing apparatus used for mowing or cutting grasses, woods and bamboos and, more in particular, it relates to a rotary plant mowing apparatus in which rotary blade units (rotors) are revolved under auto-rotation by a common rotary driving source.

2. Statement of the Related Art

Rotary plant mowing apparatus adapted to cut plants by rotary blade units each having a plurality of cutter units cause a difference of the rotational speed between a central portion and an outer portion if the radius of rotation of the rotary blade units is large, tending to cause uneven mowing near the central portion.

The problem may be overcome by decreasing the radius of the rotary blade unit, but this complicates the operation since the rotary blade unit has to be moved finely in every direction along the ground.

If the rotary blade unit is adapted to revolve under auto-rotation, mowing for a wide range is possible with less movement even if the radius of the rotary blade unit is small. However, such a rotational mechanism requires two driving sources, namely, a driving source for auto-rotation and a driving source for revolution.

Further, in a case where the rotary blade unit is adapted for auto-rotation and revolution by one driving source, when the resistance to the revolution decreases relatively, the auto-rotation speed decreases relatively and no auto-rotation force required for mowing can be obtained. The problem is to be expected.

As another problem, since only one blade edge is provided to one cutter unit, if the blade edge is damaged, the entire cutter unit has to be discarded.

Further, in existent rotary mowers or mowing apparatus, the rotary blade unit is directly coupled to a rotary shaft and joined by inserting a pin between both of the members. Accordingly, if a strong resistance or load exerts on the rotary blade unit, the pin is flexed or the rotary shaft or the motor is overloaded.

Furthermore, in the rotary mower, scattering of rocks or stones can be prevented by attaching a cover to the outside of a rotational trace of the rotary blade unit but attachment of the cover makes it impossible to cut grasses while moving the mower along the ground and mowing can be done only by putting the mower over the ground or grasses.

OBJECT OF THE INVENTION

It is a principal object of the present invention to provide a rotary plant mowing apparatus adapted to revolve a plurality of rotary blade units under auto-rotation by a common rotary driving force, thereby enabling the mowing or cutting operation with no unevenness over a wide range with less movement of the apparatus.

A second object of the present invention is to provide the rotary plant mowing apparatus in which the cutter unit has a plurality of blade edges and a cutting blade edge under use can be replaced with a new one by changing the attaching angle to the rotary blade unit.

A third object of the present invention is to provide the rotary plant mowing apparatus described above of a structure in which a rotary shaft of the rotary blade unit rotates idly upon undergoing a strong resistance to the rotary unit.

A fourth object of the present invention is to provide the rotary plant mowing apparatus having a protection cover on the outside of a revolution trade of the rotary blade unit and capable of mowing or cutting plants while moving the plant mowing apparatus horizontally.

SUMMARY OF THE INVENTION

The foregoing objects can be attained in accordance with a rotary plant mowing apparatus of the present invention in which a driven case is engaged rotationally by way of a braking device to a cylindrical frame having a rotary driving shaft pivoted therein, and a plurality of cutter rotary shafts each having a rotary blade unit jointed at a bottom end thereof and being attached to the driven case in parallel with the rotary driving shaft. Rotary bodies, such as pulleys or gears, each having a predetermined circumferential ratio, for example, 3:1, are secured to the rotary driving shaft and the cutter rotary shaft, respectively, and the rotary body for the cutter rotary shaft and the rotary body for the rotary driving shaft are connected by way of a rotation transmitting unit.

The second object can be attained in accordance with a rotary plant mowing apparatus of the present invention in which a plurality of edges are formed on the periphery of the cutter unit of the rotary blade unit and each of the blade edges is turned in the rotational direction for cutting by the change of the attaching angle to the rotary blade unit. The cutter unit of the rotary blade unit may be a flat grade of a saw teeth-like rugged blade.

The third object can be attained in accordance with the rotary plant mowing apparatus of the present invention in which the rotary blade unit and the rotary shaft are engaged under pressure by way of a resilient member.

The fourth object can be attained in accordance with a rotary plant mowing apparatus of the present invention in which a plurality of vertical slits are formed to a side cover of the apparatus.

DESCRIPTION OF THE PREFERRED EMBODIMENTS

Figure 1:
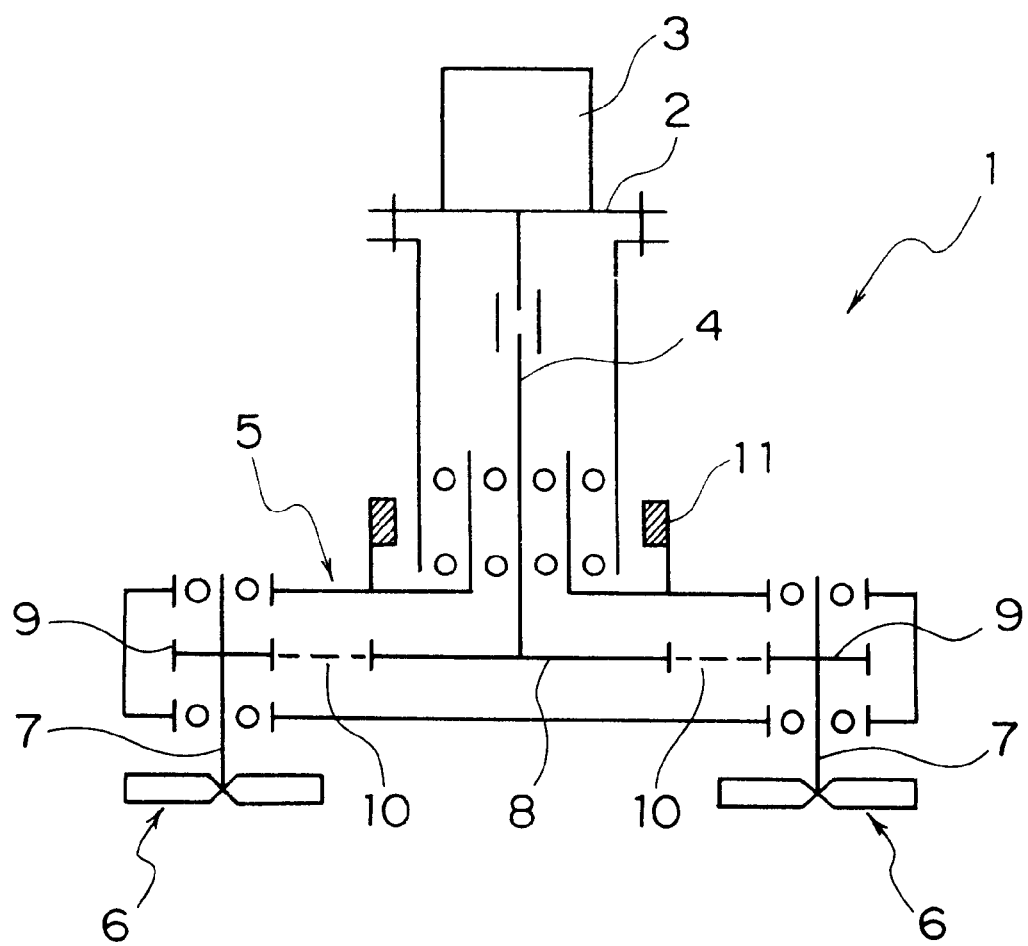
FIG. 1 is a schematic constitutional view of a rotary mowing apparatus according to the present invention.

FIG. 1 schematically shows a basic constitution of a rotary plant mowing apparatus according to the present invention in which a rotary driving shaft 4 rotated by a rotary driving unit such as a motor 3 is mounted to a main body frame 2 of a plant mowing apparatus 1 for rotation about a vertical axis.

A driven case 5 is rotationally connected with a cylindrical portion 2a integral with the main body frame 2, and two cutter rotary shafts 7, each having a rotary blade unit 6 secured at a bottom end thereof, are rotated with respect to the driven case 5 in parallel with the rotary driving shaft 4. A rotary member 8, such as a pulley or a gear, is secured to the bottom end of the rotary driving shaft 4 and, in the same manner, a rotary member 9, such as pulley or a gear, is secured to each of the two cutter rotary shafts 7.

The rotary member 8 for the rotary driving shaft 4 and the rotary member 9 for the cutter rotary shafts 7 are connected by way of a rotation transmitting unit 10, for example, a belt or a chain, such that the cutter rotary shafts 7 are rotated by the rotational force of the rotary driving shaft 4.

In the constitution as described above, when the rotary driving shaft 4 is rotated by the motor 34, the cutter rotary shafts 7 conduct auto-rotation by way of the rotation transmitting unit 10.

On the other hand, when the resistance or load to the auto-rotation of the cutter rotary shaft 7 is greater than the resistance or load to the rotation of the driven case 5, the rotation force of the rotary driving shaft 4 rotates the driven case 5, and the driven case 5 rotates entirely around the rotary body 8 as the center, by which the cutter rotary shafts 7 attached to the driven case 5 revolve relative to the rotary driving shaft 4 as a center.

As described above in the present invention the rotational force from the motor 3 is distributed as auto-rotation and revolution of the cutter rotary shafts 7 depending on the resistance to the rotation of the cutter rotary shafts 7 and the resistance to the rotation of the driven case 5.

For example, assuming the number of rotations of the motor 3 as 1000 rpm and the circumferential ratio between the rotary body 8 of the rotary driving shaft 4 and the rotary member 9 of the cutter driving shaft 7 connected by way of the rotation transmitting unit 10 as 3:1, when the resistance to rotation of the driven case 5, namely, the load to the revolution of the cutter rotary shaft 7 is large and the number of revolutions is zero, the cuter rotary shafts 7 conduct auto-rotation at 3000 rpm.

On the other hand, when the load to auto-rotation of the cutter rotary shafts 7 is large and the number of auto-rotation is zero, the cutter rotary shafts 7 conducts auto-rotation at 1000 rpm around the rotary driving shaft 4 as a center along with the rotation of the driven case of the cutter rotational shaft 7.

A braking device 11 for suppressing the rotation of one or both of the driven case 5 and the cutter rotary shaft 7 may be disposed for controlling the distribution ratio between the auto-rotation and the revolution of the cutter rotary shaft 7. In the embodiment shown in FIG. 1, a braking device 11 for suppressing the rotation of the driven case 5, that is, the revolution of the cutter rotary shaft 7 is disposed between the driven case 5 and the main body frame.

Figure 2:
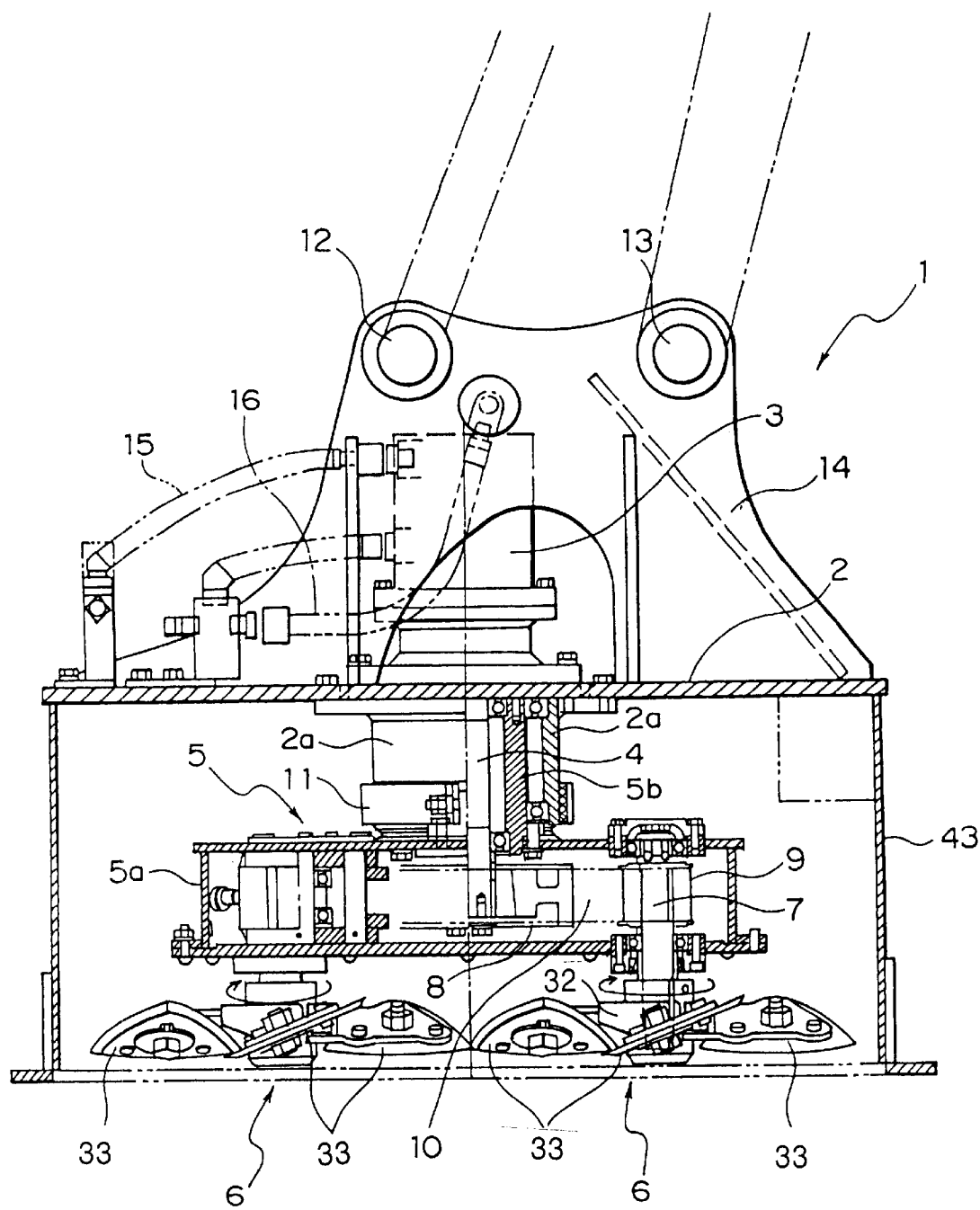
FIG. 2 is a side elevational view, partially in cross section, of a rotary plant mowing apparatus showing a preferred embodiment of the present invention.

FIG. 2 shows a preferred embodiment of the rotary plant mowing apparatus according to the present invention. In the plant mowing apparatus 1, a stay 14 having pinholes 12 and 13 are joined to an upper portion of the main body frame 2 for connection with an arm or link of a power shovel (shown by a broken line).

The main body frame 2 has an integrally formed cylindrical portion 2a in a lower portion, and a rotary driving shaft 4 driven by the motor 3 is disposed in the main body frame 2 coaxially at the center of the cylindrical portion 2a and extends downwardly. A rotary member 8, such as a pulley or a gear, is secured at the bottom end of rotary driving shaft 4.

Further, in the embodiment shown in FIG. 2, a hydraulic motor 3 is used as a rotary driving source, and hydraulic hoses 15 and 16 are connected to the hydraulic motor 3.

The driven case 5 has an integrally formed cylindrical portion 5b above the case main body 5a, and the cylindrical portion 5b is supported by rotational coupling with the cylindrical portion 2a of the main body frame 2.

Figure 4:
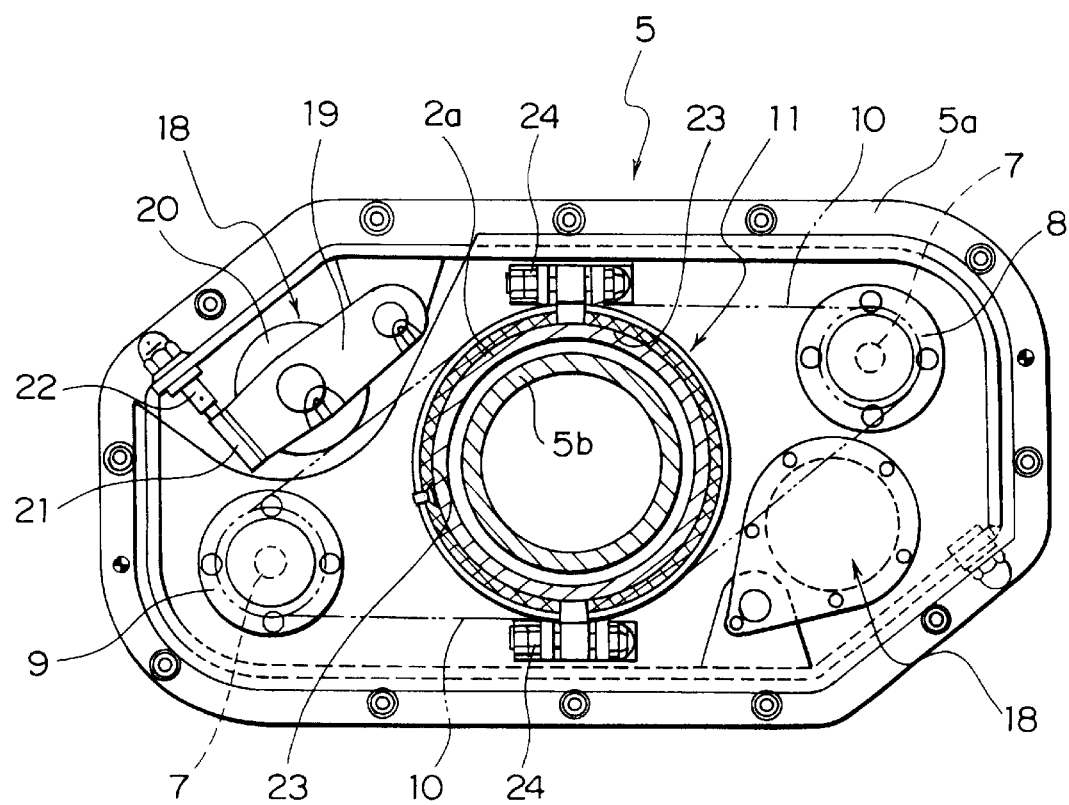
FIG. 4 is a plan view of a driven case.

As shown in FIG. 2 and FIG. 4, two cutter rotary shaft 7 and 7 are pivoted rotationally on the right and left with respect to the center along the diagonal line of the case main body 5a. The rotational member 9, such as a pulley or gear, is secured to the body of each cutter rotary shaft 7, and a rotary blade unit 6 having a plurality of cutter units 33 (four blades in the illustrated embodiment) is joined to the bottom end of the cutter rotary shaft 7.

As shown in FIG. 4, the rotation transmitting unit 10 is provided with tension by a tensioning device 18. In the tensioning device 18 of this embodiment, a tension pulley 20 is rotationally pivoted to a pivoted tension arm 19, an adjusting screw 22 is screw coupled with a screw cylinder 21 disposed at the top end of the tension arm 18, and the base end of the adjusting screw 22 is protruded to the outside of the driven case main body 5a. Thus, the pressing force of the tension pulley 20 to the belt is adjusted by turning the tension arm 19 by the adjusting screw 22.

As shown in FIG. 1 and FIG. 4, a rotation transmitting unit 10 such as a belt or a gear is laid between the driving side rotary member 8 of the rotary driving shaft 4 and the driven side rotary member 9 of the cutter rotary shaft 7, so that the rotational force of the rotary driving shaft 4 is transmitted by way of the rotary members 8 and 9 to the cutter rotary shaft 7.

In the illustrated embodiment, gears are used as the rotary members 8 and 9, and a timing belt is used as the rotation transmitting unit 10, but the rotation transmitting mechanism is not restricted only to them but the rotary members 8 and 9 may be engaged directly or by way of other gears.

As shown in FIG. 4, the rotation transmitting unit 10 is given with tension by a tensioning device 18. In the tensioning device 18 of this embodiment, a tension pulley 20 is rotationally pivoted to a pivoted tension arm 19, an adjusting screw 22 is screw coupled with a screw cylinder 21 disposed at the top end of the tension arm 18, and the base end of the adjusting screw 22 is protruded to the outside of the driven case main body 5a. Thus, pressing force of the tension pulley 20 to the belt is adjusted by turning the tension arm 19 by the adjusting screw 22.

In the illustrated embodiment, two sets of the tension devices 18 are disposed in a right-to-left symmetry to the outside of the rotation transmitting unit 10.

Figure 3:
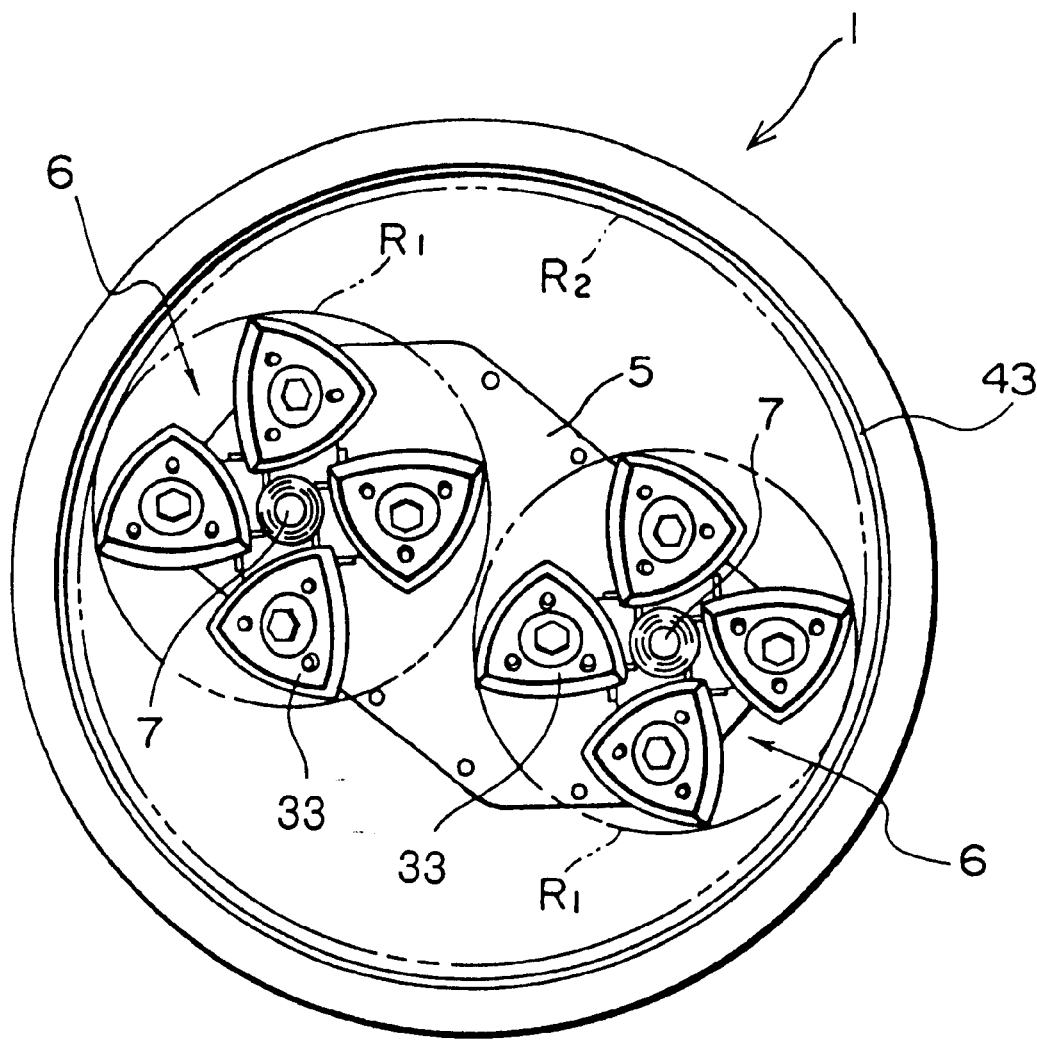
FIG. 3 is a bottom view of the rotary plant mowing apparatus.

With the constitution as described above, in the plant mowing apparatus according to the present invention, the rotational force of the hydraulic motor 3 is transmitted by way of the rotary driving shaft 4, the rotary member 8, the rotation transmitting unit 10, the rotary member 9 and the cutter rotary shaft 7 to the rotary blade unit 6, by which plants are cut mainly by auto-rotation of the rotary blade units 6. Also, the entire driven case 5 is rotated by the adjustment of the resistance to the auto-rotation of the rotary blade unit 6 and the resistance to the rotation of the entire driven case 5 to revolve the rotary blade units 6 thereby changing the position of the rotary blade units 6. FIG. 3 shows the relation, in which $R_1$ indicates the auto-rotation trace of the rotary blade unit 6 and $R_2$ indicates the revolution trace of the rotary blade unit 6.

By the way, since the mowing apparatus 1 cuts out plants mainly by the auto-rotation of the rotary blade units 6, it is necessary to provide a control device for suppressing the number of revolutions of the cutter rotary shaft 7 to ensure the auto-rotation force necessary for mowing or cutting the plants.

For this purpose, in the plant mowing apparatus 1 of the present invention, an annular braking device 11 in sliding contact with the outer circumference of the cylindrical portion 2a of the main body frame 2 is disposed integrally in the lower part of the cylindrical portion 5b of the driven case 5, such that the rotation of the driven case 5, that is, the revolution of the cutter rotary blades 7 is suppressed by the frictional resistance between the braking device 11 and the cylindrical portion 2a of the main body frame 2. Then, the braking device 11 and the cylindrical portion 2a of the main body frame 2. Then, the braking device 11 shown in FIG. 4 has right and left bisected brake shoes 23, 23 each reinforced with a semi-circular plate and the ends of the brake shoes 23 and 23 are clamped by clamped members 24, such as bolts and nuts, so that the braking force can be controlled by adjusting the clamping force.

Figure 5:
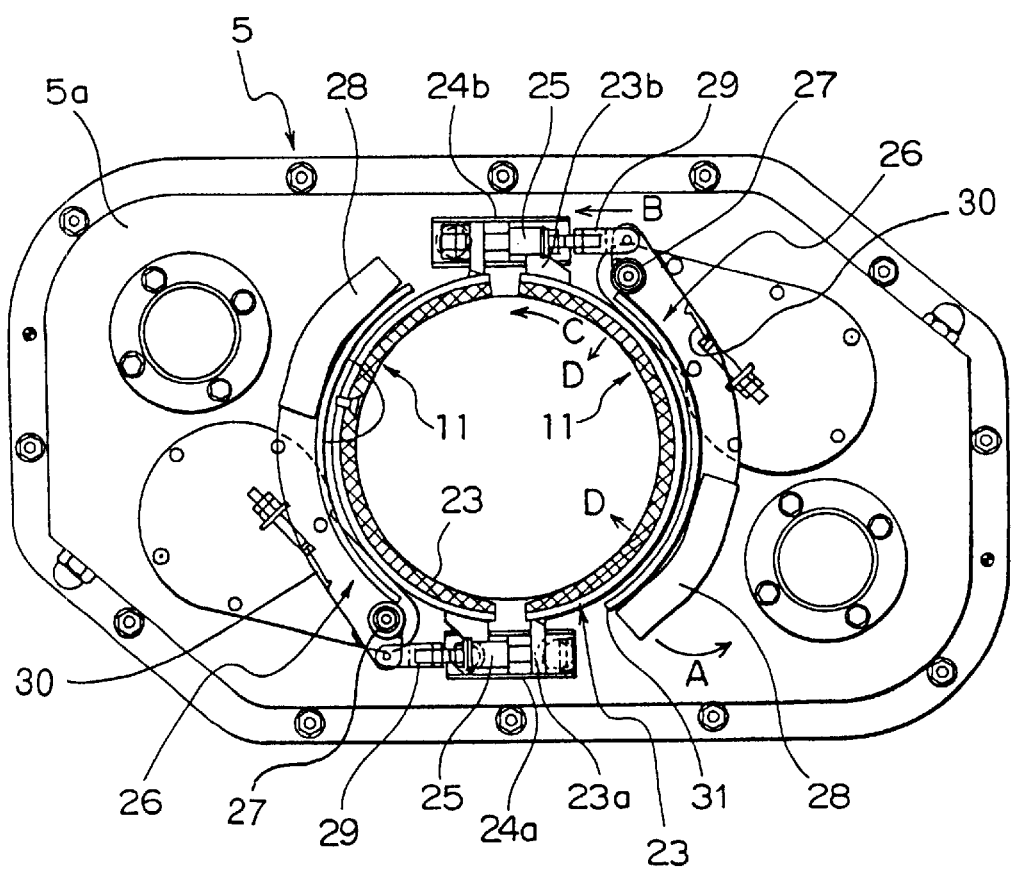
FIG. 5 is a plan view for a driven case in another preferred embodiment in which a main body frame and a cylindrical portion of the driven case are not illustrated.

FIG. 5 shows another embodiment of a rotation braking device of the driven case 4 in which the cylindrical portion 2a for the main body frame 2 and the cylindrical portion 5b for the driven case 5 are not illustrated.

In the rotation braking device of the embodiment shown in FIG. 4, since the clamping force of the brake shoe 23 is set to a predetermined value, it may suffer from a disadvantage that no required braking force can be obtained depending on the inertia of rotation of the driven case 5 or the wear of the brake shoe 23.

For overcoming this problem, the braking device shown in FIG. 5 is adapted to utilize the centrifugal force of rotation of the driven case 5 in that the braking force increases in proportion with the rotational speed of the driven case 5 and required number of auto-rotations can be kept automatically for the cutter rotary shaft 7. The constitution is to be explained below.

In the bisected brake shoe 23 of the braking device 11 shown in FIG. 5, a fixed side bracket 23a at an end is fixed to one connection member 24a on the upper surface of the driven case 5, while a movable side bracket 23b at the other end is engaged slidably in a long slot 24 of a connection member 24b at the other end of the case 4. With this constitution, when the bracket 23b on the other end of the brake shoe 23 is brought into sliding contact in the long slot 25 to tighten the brake shoe 23, the brake shoe 23 is in press contact with the cylindrical position 2a of the main body frame 2 (refer to FIG. 4).

Further, a centrifugal operation arm 26 extending along the brake shoe 23 is pivoted near the base end thereof around a fulcrum 27 as a center at the upper surface of the driven case 5.

The centrifugal operation arm 26 has a centrifugal weight 28 disposed integrally at the top end, and a link lever 29 connected with the movable side bracket 23b of the brake shoe 23 is pivoted at the rear end on the outside of the fulcrum 27.

When the rotational speed of the driven case 5 increases, the centrifugal weight 28 swings in the direction of an arrow A by the centrifugal force and the rear end of the centrifugal operation arm 26 is forced backwardly in the direction of an arrow B. This causes the movable side bracket 23b of the brake shoe 23 to move slidingly inward of the long slot 25 by way of the link lever 29, so that the brake shoe 23 is tightened in the direction of an arrow C. Accordingly, the brake shoe 23 is in press contact to the cylindrical portion 2a of the main body frame 2, and the rotation of the driven case 5, that is, the revolution of the cutter rotary shaft 7 is suppressed by the frictional resistance. Since the braking force is obtained from the centrifugal force of rotation of the driven case 5, a braking force in proportion with the rotational force of the driven case 5 is generated autogenously.

Preferably, a spring 30 for resiliently biasing the centrifugal operation arm 26 to a stopper 31 at the inside is disposed so that the braking force of the brake 22 can be adjusted by changing spring pressure.

The braking device is preferably disposed in a right-to-left symmetry with respect to the center of the driven case 5. This can provide a well balanced and highly reliable braking action.

As has been described above, according to the plant mowing apparatus 1 of the present invention, since the rotary blade units 6 cut plants by auto-rotation by the common motor 3 while they are displaced by revolution with respect to the rotary driving shaft 4, the moving amount of the apparatus during mowing or cutting operation can be reduced.

Since the braking device 11 for restricting the revolution of the rotary blade units 6 is provided, a worry that the unit 6 lacks in the auto-rotation force can be avoided. Particularly, in a case of applying braking by utilizing the rotational force of the driven case 5, since the braking force increases in proportion with the rotational speed of the driven case 5, the auto-rotation of the rotary blade unit 6 can always be controlled automatically to a required number of rotations.

Figure 6:
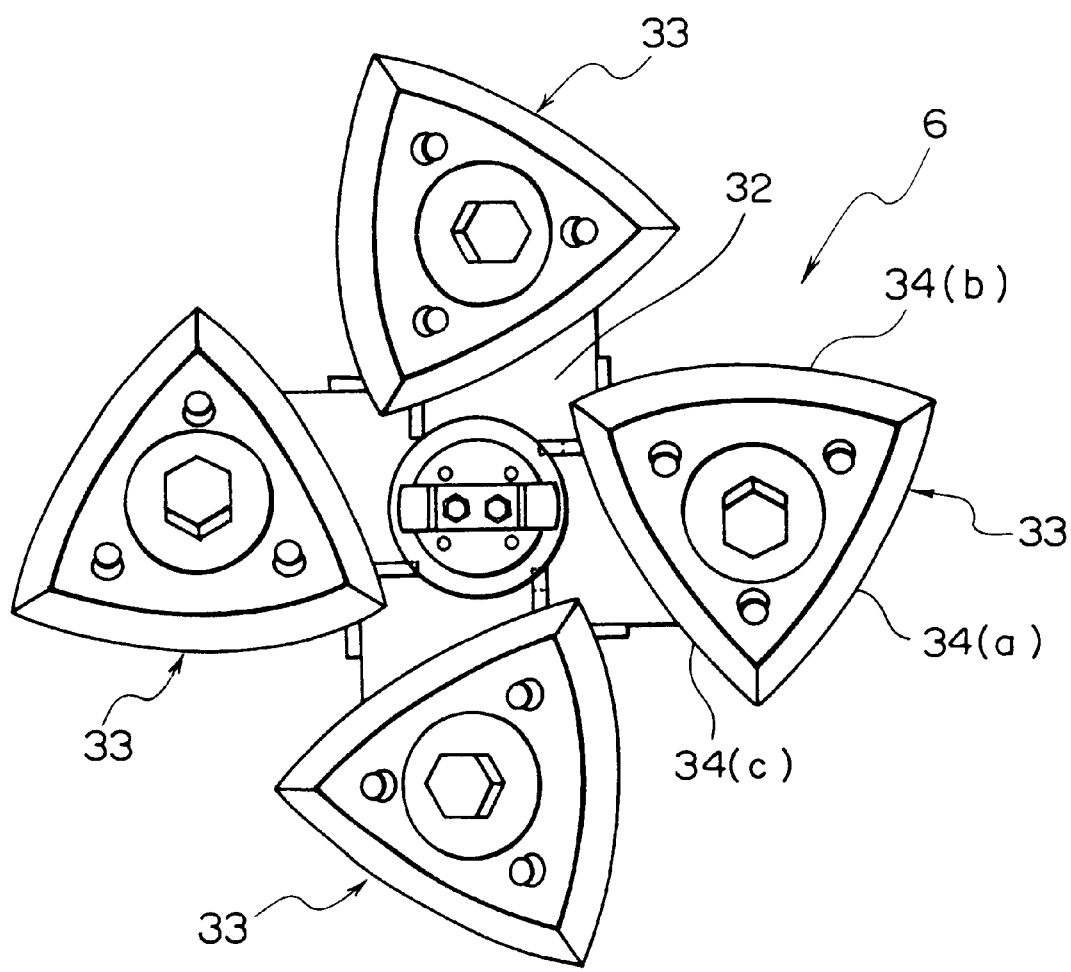
FIG. 6 is a bottom view of a rotary blade unit.

As shown in FIG. 6, the rotary blade unit 6 comprises a plurality of cutter units 33 detachably joined radially around a base member 32 and the base member 32 is joined to the cutter rotary shaft 7. In the illustrated embodiment, four cutter units 33 are attached to the base member 32 with the blade edge being downwardly inclined in the direction of rotation.

Preferably, each of the cutter units 33 has a plurality of blade edges 34 directed in different directions at the circumferential edge such that each blade edge 34 can be turned to the rotational direction by changing an attaching angle to the base member 32.

In the illustrated embodiment, the circumferential edge of the cutter unit 33 comprises three arcuate blade edges 34(a), 34(b) and 34(c), but the number of the blade edges 34 may be two or three or more. It is preferred that adjacent blade edges 34 form an acute angle therebetween as shown in the figure.

As described above, in each of the cutter units 33, each of the blade edges can be used such that a chipped or worn blade edge can be replaced with another new one for cutting by changing the attaching angle to the base member 32. Accordingly, the cutter unit 33 can be effectively utilized for a long period of time and, further, the constitution for each of the blade edges 34 can be varied and selected in accordance with the purpose of operation.

Furthermore, by making an acute angle at the tip between adjacent blade edges, hard grasses or woods can also be cut.

The rotary blade unit 6 is generally constituted such that the gravitational center is situated at a geometrical center but the gravitational center may be situated at an eccentric position for the rotary blade unit 6. When the center of gravitation is situated at the eccentric position, increased cutting force by strong inertia can be obtained upon rotation of the rotary blade unit 6.

Figure 7:
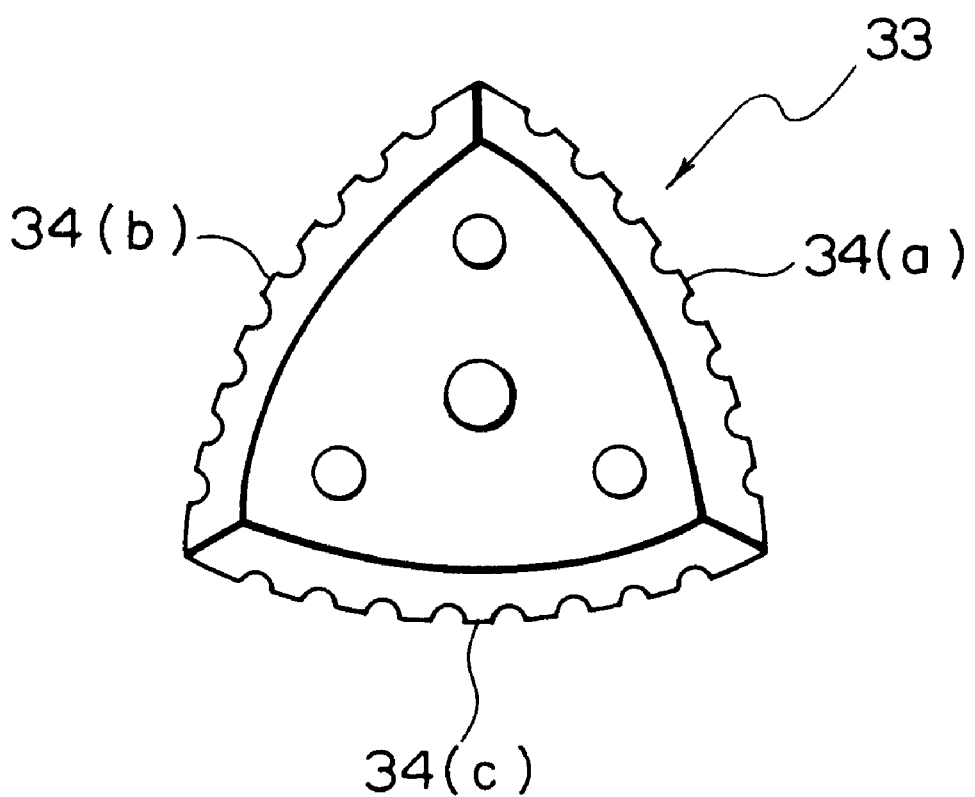
FIG. 7 is a plan view of a cutter unit in another embodiment.

The blade edge 34 of the cutter unit 33 may be a flat blade as shown in FIG. 6, but it may be formed as a rugged edge like that a saw teeth edge as shown in FIG. 7 when it is used as a cutting blade for woods or bamboos. Further, the blades 34(a), 34(b), 34(c) may be formed into various shapes for blade edges suitable to the kinds of plants.

Figure 8:
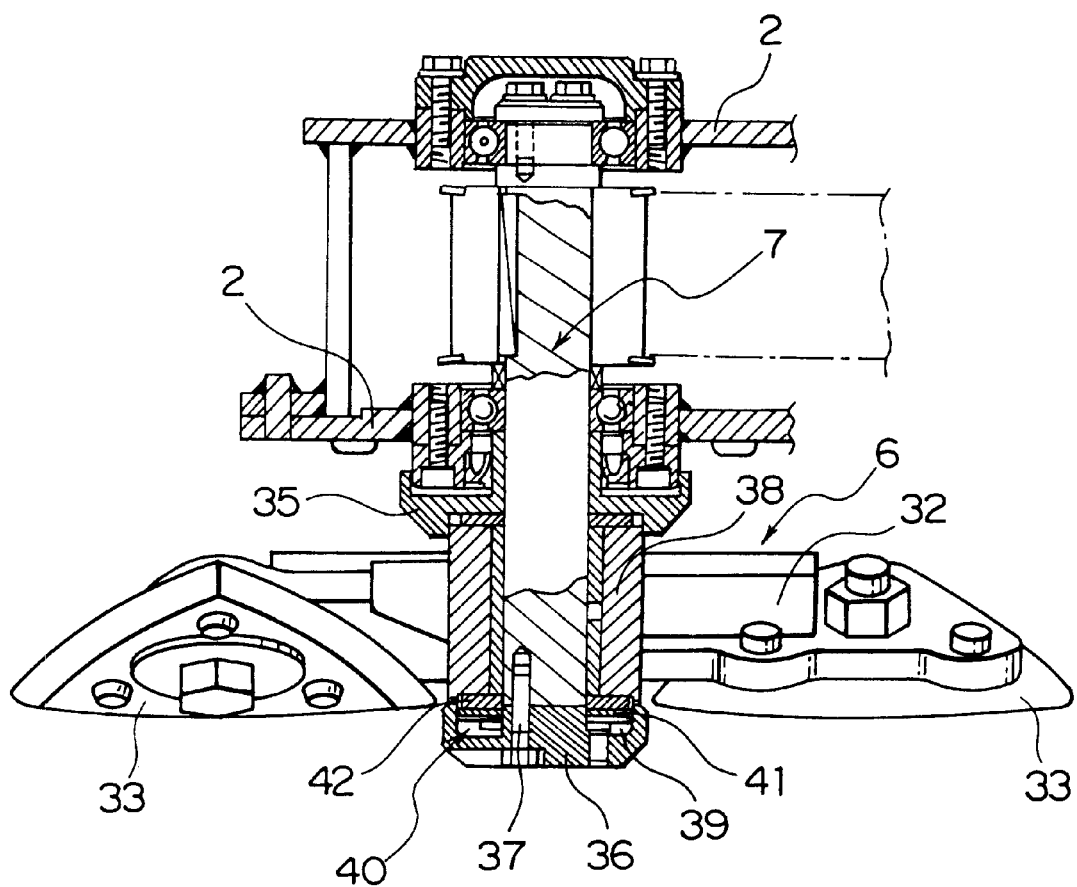
FIG. 8 is a vertical cross sectional view illustrating engagement under pressure of a rotary blade unit.
Figure 9:
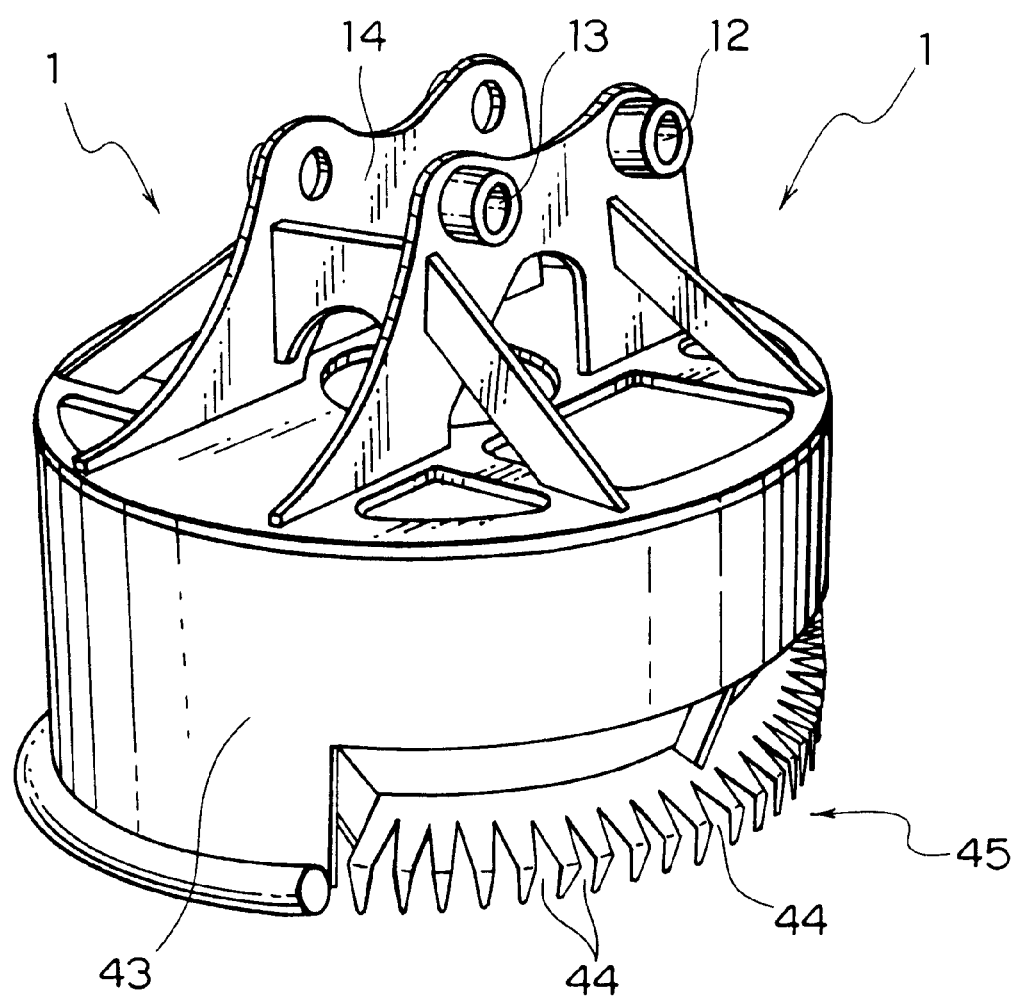
FIG. 9 is a perspective view showing an embodiment of a side cover.

The rotary blade unit 6 may be directly coupled by fitting a fitting portion 38 of the base member 32 on the cutter rotary shaft 7 and inserting a pin between both of the members. Preferably, the cutter rotary shaft 7 and the base member 32 of the rotary blade unit 6 are joined under pressure by predetermined resilient force such that they can rotate integrally as shown in FIG. 8. Specifically, as shown in FIG. 8, a stopper member 35 is secured to the cutter rotary shaft 7 and a flange member 36 is joined at the bottom end of the cutter rotary shaft 7 with a bolt 37, or the like, by way of a spring 40.

The base member 32 of the rotary blade unit 6 has a fitting portion 38 at the center portion for fitting to the cutter rotary shaft 7, the cutter rotary shaft 7 is inserted by way of an oilless sleeve into the fitting portion 38 and then the flange member 36 is clamped and joined to the bottom end of the cutter rotary shaft 7.

In the flange member 36, a spring 40 and a pressure receiving plate 41 are fitted in a recess 39 formed on the press contact side, by which the rotary blade unit 6 is joined in a resiliently urged state between the stopper member 35 of the cutter rotary shaft 7 and the flange member 36. Accordingly, when an excess resistance exerts on the rotary blade unit 6, the cutter rotary shaft 7 rotates idly and, on the other hand, when the resistance decreases, the cutter rotary shaft 7 and the rotary blade unit 6 are again engaged under pressure and rotate integrally. A resin wear or friction member is used preferably for the press contact surface between the cutter rotary shaft 7 and the rotary blade 6.

As shown in FIG. 3, in the plant mowing apparatus 1, a side cover 43 for covering the outside of the revolution trace of the rotary blade unit 6 is attached to the main body frame 2. Therefore, in a case where the side cover 43 is constituted with a closed plate, the mowing apparatus 1 is lifted by an arm of a power shovel and plants are gradually cut out into chips while lowering the apparatus 1 so as to put over the plants. In this case, since the cutter unit 33 of the rotary blade unit 6 is downwardly inclined in the rotational direction, an ascending current occurs in the main body frame 2 and the ascending current stands grasses or woods upright and blow the cut chips upwardly. This can preclude entanglement of plants to improve the efficiency of the mowing or cutting operation. Further, since the plants are cut into chips, it facilitates the subsequent treatment and is favorable for preparing green manure.

Figure 10:
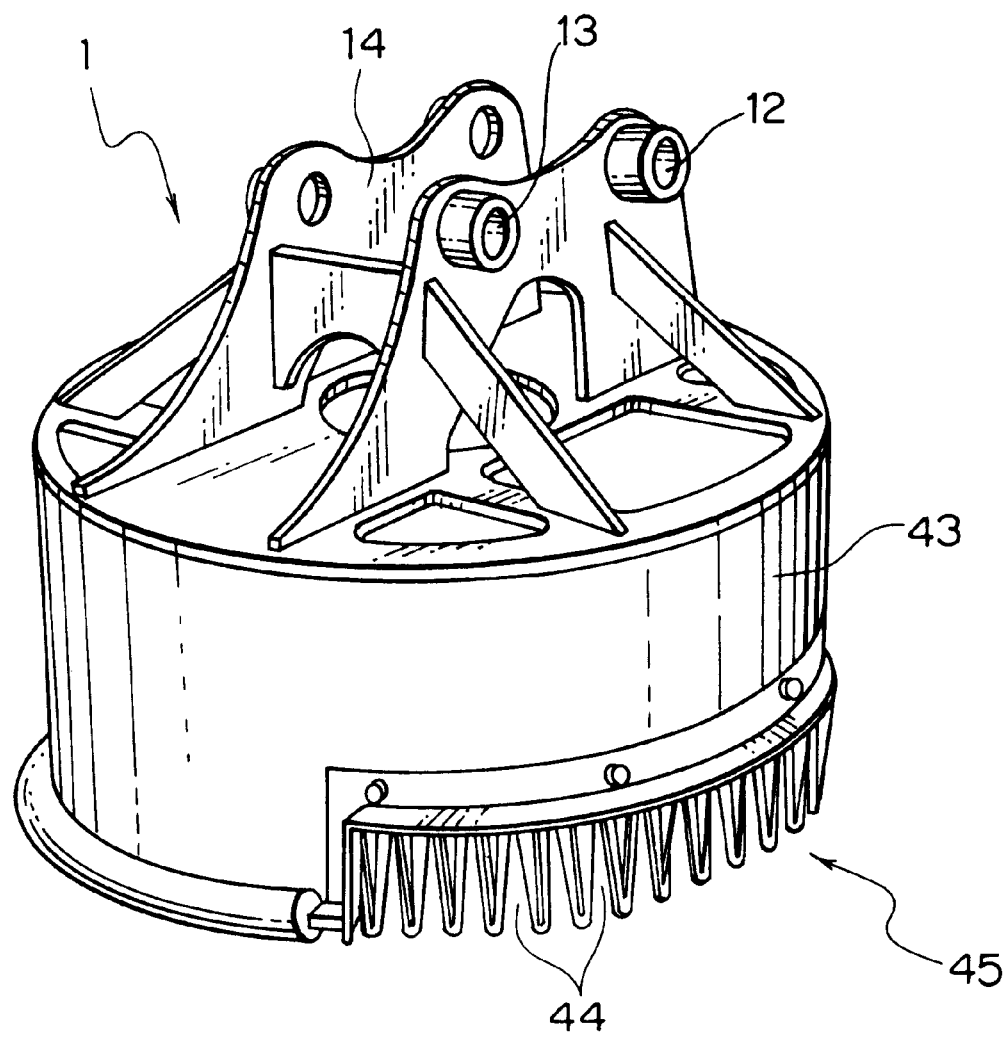
FIG. 10 is a perspective view of a side cover in another embodiment.

However, in a case where the side cover 43 is made of a closed plate, it is impossible to cut plants while laterally moving the mowing apparatus 1 along the ground. In order to overcome the problem, a group of vertical slits 44 may be formed in the lower portion of the side cover 43 as shown in FIG. 10.

The lateral width of the slit 44 is dimensioned such that scattering of dangerous matters, such as rocks or stones, can be prevented and plants can enter through the slits 44. Further, the slits 44 may be disposed over the entire cir-cumference of the cover 43 but it may preferably be limited to a portion of the side cover 43 for reducing the scattering of soils or sands.

Figure 11:
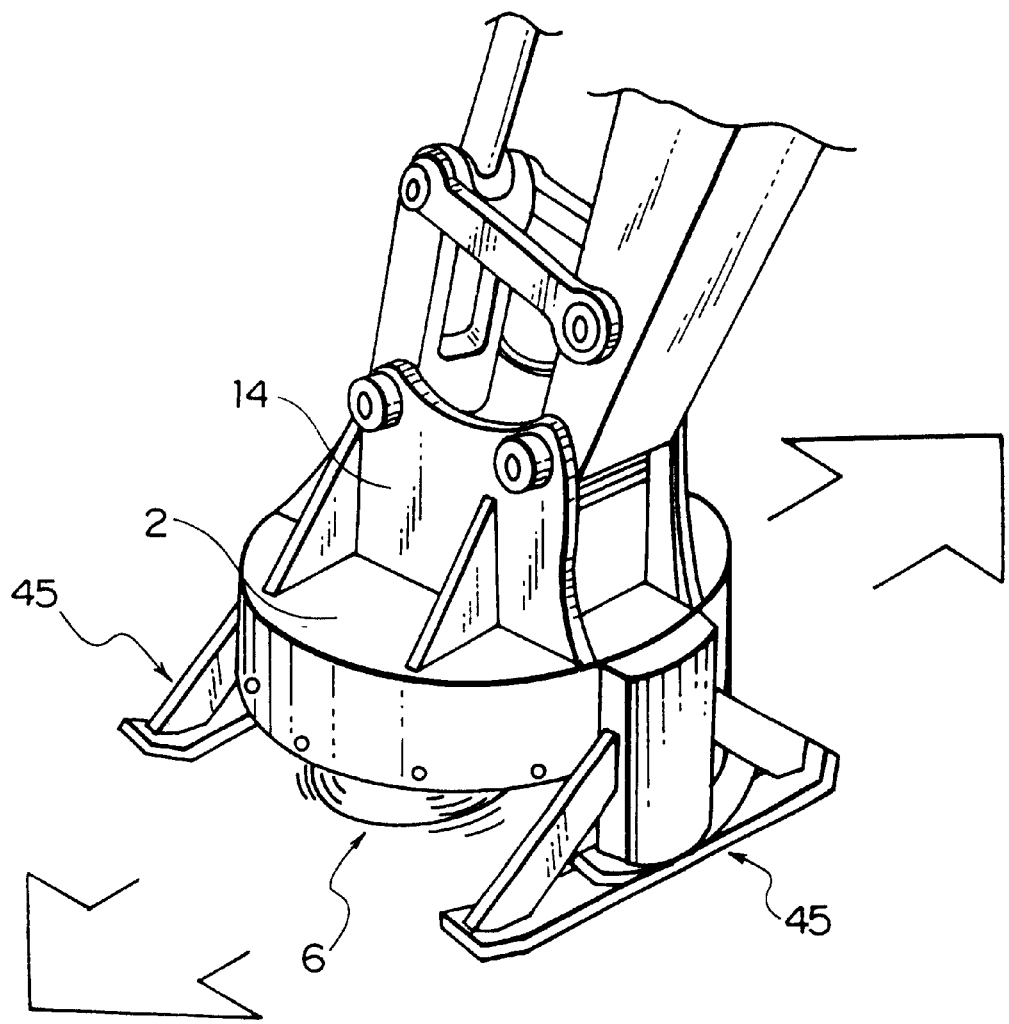
FIG. 11 is a perspective view of a rotary plant mowing apparatus in yet another embodiment of the present invention.

In a mowing apparatus 1 shown in FIG. 11, a lower portion of the slide cover 43 is removed and a pair of opposing skids 45 are attached to the outside of the main body frame 2. The lower end of the skid 45 extends below the rotary blade unit 6. Therefore, the plant mowing apparatus 1 moves smoothly upon cutting while moving the apparatus 1 by the arm of the power shovel in the direction of arrows. In addition, since the apparatus is moved laterally while grounding skid 45 to the earth, there is no requirement for adjusting the height of the apparatus by the arm to facilitate the operation.

What is claimed is:

1. A plant mowing apparatus comprising a main body frame having an integral, downwardly extending cylindrical portion, a rotary driving shaft rotatably mounted to the main body frame coaxially with the cylindrical portion and driven by a rotary driving unit, a driven case engaging the cylindrical portion of the main body frame for rotation with respect thereto, a cutter rotary shaft mounted for rotation in the driven case and disposed in parallel with the rotary driving shaft, a rotary blade unit having a cutter unit attached to a base member and joined to a bottom end of the cutter rotary shaft, a rotation transmitting unit disposed between the rotary driving shaft of the main body frame and the cutter rotary shaft of the driven case for transmitting the rotational force of the rotary driving shaft to the rotary blade unit, wherein a braking device is disposed between the cylindrical portion of the main body frame and the driven case for suppressing rotation of the driven case.

2. A plant mowing apparatus as defined in claim 1, wherein the braking device for suppressing rotation of the driven case comprises a brake shoe disposed so as to be in press contact with, and apart from, a circumferential surface of the cylindrical portion of the main body frame, a centrifugal operation arm pivoted by a fulcrum to an upper surface of the driven case, and having a centrifugal weight at one end and a connection member with the brake shoe at the other end thereof, and a spring for resiliently biasing the centrifugal operation arm toward the center of the driven case, and wherein the brake shoe is brought into press contact with the circumferential surface of the cylindrical portion of the main body frame by the centrifugal operation arm that swings by a centrifugal force of rotation of the driven case.

3. A plant mowing apparatus as defined in claim 1 or claim 2, wherein the base member of the rotary blade unit has cutter units detachably mounted on the base member, and each of the cutter units has a plurality of blade edges formed at a circumferential edge thereof and directed in different directions, such that each of the blade edges is turned in the rotational direction by a change of an attaching angle of the cutter unit to the base member.

4. A plant mowing apparatus as defined in claim 3, wherein the blade edge of the cutter unit is formed with a saw teeth-like uneven edge.

5. A plant mowing apparatus as defined in claim 3, wherein the adjacent blade edges form an acute angular tip therebetween.

6. A plant mowing apparatus as defined in claim 5, wherein the gravitational center of the rotary blade unit is situated at an eccentric position in the rotary blade unit.

7. A plant mowing apparatus as defined in claim 6, wherein the cutter rotary shaft and the rotary blade unit are joined under pressure with a predetermined resilient urging force such that they can rotate integrally.

8. A plant mowing apparatus as defined in claim 7, wherein a side cover covering an outside of a revolution trace of the rotary blade unit is attached to the main body frame and a comb portion comprising a group of vertical slits is disposed on a lower portion of the side cover.

9. A plant mowing apparatus as defined in claim 6, wherein a pair of skids situated outside of the revolution trade of the rotary blade unit and opposed to each other are disposed to the main body frame.

* * * * *

UNITED STATES PATENT AND TRADEMARK OFFICE
CERTIFICATE OF CORRECTION

PATENT NO. : 6,385,951 B1
DATED : May 14, 2002
INVENTOR(S) : Junji Ogawa

It is certified that error appears in the above-identified patent and that said Letters Patent is hereby corrected as shown below:

<u>Title page,</u>
Item [73], Assignee, "Marujun Juko Kabushikiasha, Inasa-gun (JP)" should be
-- Marujun Juko Kabushikikaisha, Inasa-gun (JP) --

Signed and Sealed this

Fourteenth Day of January, 2003

JAMES E. ROGAN
*Director of the United States Patent and Trademark Office*